United States Patent
De Lange et al.

(10) Patent No.: US 7,600,239 B2
(45) Date of Patent: Oct. 6, 2009

(54) METHOD OF AUTOMATIC EXECUTION RECEIVING STATION

(75) Inventors: Alphonsius Anthonius Jozef De Lange, Eindhoven (NL); Marcus Franciscus Maria Schlueper, Eindhoven (NL); Abel Koenraad Wijma, Utrecht (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1559 days.

(21) Appl. No.: 09/883,440

(22) Filed: Jun. 18, 2001

(65) Prior Publication Data

US 2002/0062484 A1 May 23, 2002

(30) Foreign Application Priority Data

Jun. 19, 2000 (EP) .................................. 00202141

(51) Int. Cl.
  *H04N 7/173* (2006.01)
(52) U.S. Cl. .............................. 725/36; 725/40; 725/60; 709/217
(58) Field of Classification Search ............. 725/32–61, 725/106–142; 709/217–223
  See application file for complete search history.

(56) References Cited

U.S. PATENT DOCUMENTS

| | | | | |
|---|---|---|---|---|
| 5,818,440 A | | 10/1998 | Allibhoy et al. ............. 345/327 |
| 5,914,746 A | | 6/1999 | Matthews, III et al. ........ 348/10 |
| 5,929,849 A | * | 7/1999 | Kikinis ........................ 725/113 |
| 6,076,109 A | * | 6/2000 | Kikinis ........................ 709/228 |
| 6,141,003 A | * | 10/2000 | Chor et al. .................. 715/719 |
| 6,205,440 B1 | * | 3/2001 | Nusbickel .................... 707/2 |
| 6,205,485 B1 | * | 3/2001 | Kikinis ........................ 709/231 |
| 6,233,734 B1 | * | 5/2001 | Macrae et al. ................ 725/50 |
| 6,240,555 B1 | * | 5/2001 | Shoff et al. .................. 725/110 |
| 6,243,142 B1 | * | 6/2001 | Mugura et al. .............. 348/564 |
| 6,324,694 B1 | * | 11/2001 | Watts et al. ................. 725/32 |
| 6,415,438 B1 | * | 7/2002 | Blackketter et al. ......... 725/136 |
| 6,567,984 B1 | * | 5/2003 | Allport ........................ 725/110 |
| 6,571,344 B1 | * | 5/2003 | Sitnik .......................... 713/502 |
| 6,756,997 B1 | * | 6/2004 | Ward et al. .................. 715/716 |
| 6,948,183 B1 | * | 9/2005 | Peterka ........................ 725/25 |
| 7,373,650 B1 | * | 5/2008 | Rodriguez et al. ........... 725/41 |

(Continued)

FOREIGN PATENT DOCUMENTS

WO WO9962248 5/1999
WO WO9931883 6/1999

OTHER PUBLICATIONS

J.Muhlbach, "Open TV—Vom Pionier Zum Marktfuhrer".

*Primary Examiner*—Annan Q Shang

(57) ABSTRACT

A method and system are provided which allow for automatic execution of applications on a receiving station (109). As applications may provide their own interface, this interferes with the desired consistent interface a user has when "zapping" from channel to channel. Therefore, execution of applications is disabled when a user selects a channel, and enabled whenever it is determined that the user is actively viewing the selected channel. This happens when, for example, the channel identifier (202) is removed from the screen, or the last element of a menu bar (203) or other on-screen display element is erased. A timer, reset whenever the user provides input, and increased every second, can also be used. When the timer exceeds a certain value, it can be assumed the user wants to view the selected channel, and application execution can be enabled.

12 Claims, 1 Drawing Sheet

U.S. PATENT DOCUMENTS

Figure 1:
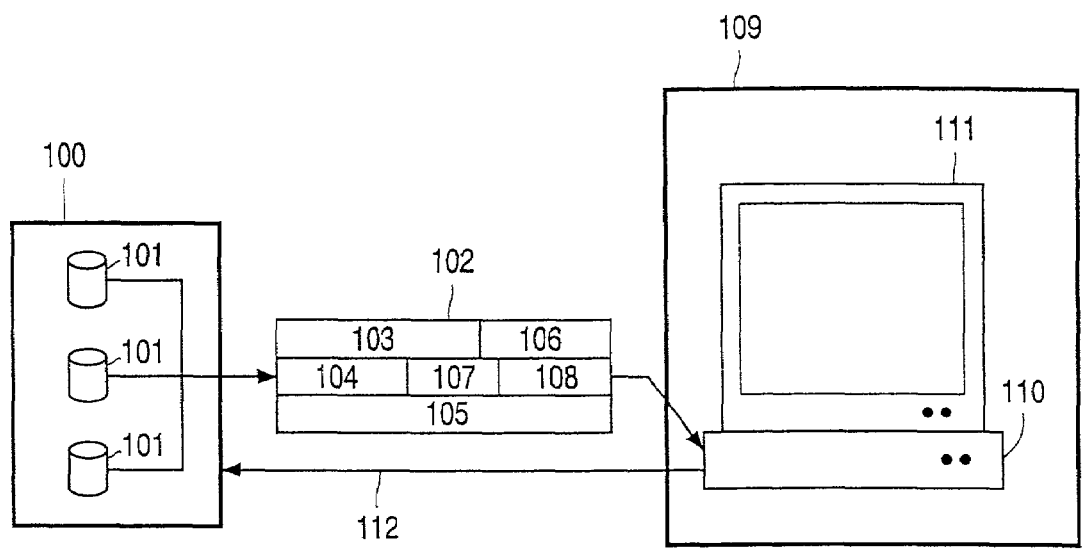

| | | | |
|---|---|---|---|
| 7,451,475 B1 * | 11/2008 | Oz et al. | 725/127 |
| 7,540,012 B1 * | 5/2009 | Herzberg et al. | 725/87 |
| 2002/0054601 A1 * | 5/2002 | Barraclough et al. | 370/401 |
| 2002/0056086 A1 * | 5/2002 | Yuen | 725/9 |
| 2002/0056094 A1 * | 5/2002 | Dureau | 725/38 |
| 2002/0059629 A1 * | 5/2002 | Markel | 725/100 |
| 2004/0261127 A1 * | 12/2004 | Freeman et al. | 725/135 |
| 2005/0125823 A1 * | 6/2005 | McCoy et al. | 725/34 |

* cited by examiner

METHOD OF AUTOMATIC EXECUTION RECEIVING STATION

The invention relates to a method of automatic execution of an application on a receiving station, comprising receiving a signal comprising a plurality of streams, each stream being associated with a channel on the receiving station and comprising a content portion and zero or more application portions, receiving a channel selection from a user, displaying the content portion of the stream associated with the selected channel, and when execution of applications is enabled, executing an application present in the application portion, if any, of the stream associated with the selected channel.

The invention further relates to a receiving station, comprising a receiving unit for receiving a signal comprising a plurality of streams, each stream being associated with a channel on the receiving station and comprising a content portion and zero or more application portions, a selection unit for receiving a channel selection from a user, a display unit for displaying the content portion of the stream associated with the selected channel, and an execution unit for determining if execution of applications is enabled, and if so, executing an application present in the application portion, if any, of the stream associated with the selected channel.

A method and system according to the preamble are known from "OpenTV-Vom Pionier zum Marktführer", by J. Mühlbach, in Fernseh- und Kino-technik 53, volume 7, 1999.

With interactive television systems, viewers can be offered many new services. Interactive television systems are capable of displaying text and graphic images in addition to typical video programs. Interactive television systems are also capable of registering viewer actions or responses. Proposed features of interactive television include a variety of marketing, entertainment and educational capabilities such as allowing a user to interact with programs shown on the television by ordering advertised products or services, competing against contestants in a game show, or requesting specialized information regarding particular programs.

Typically, a broadcast service provider generates an interactive television signal for transmission to a viewer's television. The interactive television signal includes an application portion consisting of application code or control information, as well as a content portion. The content portion may contain such elements as one or more television programs, audio signals, subtitle information and Teletext applications. The broadcast service provider multiplexes the content and application portions into a single signal for transmission to a receiver connected to the user's television.

The user has a set-top box, connected to his television. This set-top box receives the transmitted signal, separates the application portion from the rest and decompresses the respective portions of the signal. The set-top box uses the application portion information to, for example, execute an interactive application while the content portion is transmitted to the television. The set-top box may combine the content portion with interactive graphics or audio generated by the application prior to transmitting the content to the television. The interactive graphics and audio may present additional information to the viewer or may prompt the viewer for input. The interactive application may also allow the user to replay selections of the content portion. The set-top box may provide viewer input or other information to the broadcast service provider via a modem connection.

Interactive television applications may consist of a set of program modules. The set of modules forming an application is typically self-contained in that all of the code needed by the application is in the set of modules. The first module is a directory module which identifies all of the modules which are part of the application. The entire set of modules, which is listed in the directory module, is transmitted via the broadcast channel to the set-top box and the application is executed. If a first interactive television application has completed execution and a second is to be executed, the directory and other modules of the second application are transmitted to the set-top box and the second application is executed. The entire set of modules used by the second application are transmitted even though some of the modules might be identical to modules used by the first application.

A television is capable of receiving more than one channel, and each channel may have its own signal with a content portion and an application portion. When the user does not want to see just one channel, but instead prefers to "zap" from one channel to another, he may potentially "zap" across multiple channels having application portions. Normally, the application portion would be downloaded and executed, but in this situation, this is not preferred. Typical "zap" behavior means that the user only wants to peek at the current channel, and move to another in a few seconds if it is not interesting enough. Automatically downloading and executing the application portion would interfere with this behavior. In the television system as described in the publication mentioned above, the French pay-TV broadcaster TPS automatically starts an application when it is detected on the current channel, but each such application starts with a start-up screen to allow the user to start interacting with the application. If the user does not want to interact with the application, he must press the channel up/down button to quit the application and to "zap" to another channel.

A disadvantage of this system is that the user interface is not consistent. When zapping to a channel where an application is present, that application is automatically downloaded and executed. This means that a different graphical user interface is shown while zapping through channels that carry different applications. The only way to enforce a consistent look and feel in this system is to enforce a standard for graphical user interfaces for all applications on all channels. This is very difficult to achieve. Further, when the application is being downloaded, no user interaction is possible except for moving to another channel. Any user interaction, including the display of On-Screen Display elements, is interrupted as soon as downloading of an application starts on the current channel. This is unexpected behavior for the user.

It is an object of the invention to provide a method according to the preamble, which allows for an easy and consistent way of navigating through channels, while allowing automatic downloading of applications.

This object of the invention is achieved in a method which is characterized in that execution of applications is disabled in response to a user selecting a channel, and execution of applications is enabled in response to the occurrence of an enabling event, indicating that the user is actively viewing the selected channel.

To ensure a consistent interface and to provide an easy way of navigating through channels, execution of applications is disabled whenever the user selects a channel. The user then is not presented with any application-specific menus or interfaces. Therefore, the interface remains consistent, and there is no interruption in the user's navigating while an application starts or is being downloaded in whole or in part. Once it is determined that the user is actively viewing the selected channel, execution of applications is enabled.

In an embodiment a timer is reset in response to any user interaction with the receiving station, and the enabling event comprises the timer reaching a predetermined timeout value. This embodiment has the advantage that the timer exceeding the predetermined timeout value shows that the user has not interacted with the receiving station for that time, and so it can be assumed that the user is actively viewing the selected channel.

In a further embodiment the enabling event comprises erasing an on-screen display element from a display system. This embodiment has the advantage that erasing an on-screen display element also shows that the user has not interacted with the receiving station for a certain amount of time, and this embodiment is easy to implement using a small modification to the on-screen display unit. It also works for any type of on-screen display element.

In a further embodiment the on-screen display element is an identifier for the current channel. This embodiment has the advantage that the identifier is shown for every channel, as opposed to menus and the likes which are only shown on some channels, or sometimes not at all unless the user requests it. It also provides an intuitive indicator for the user, as he can now associate the erasure of the identifier with the starting of any applications, if present.

In a further embodiment the on-screen display element is the last of a plurality of on-screen display elements being displayed. This embodiment has the advantage that the removal of all on-screen display elements clearly shows that the user is not interested in interacting with the receiving station, and so any application can be executed.

It is a further object of the invention to provide a receiving station according to the preamble, which allows for an easy and consistent way of navigating through channels, while allowing automatic downloading of applications.

This object of the invention is achieved in a receiving station which is characterized in that the execution unit is arranged to disable execution of applications in response to a user selecting a channel, and the execution unit is arranged to enable execution of applications in response to the occurrence of an enabling event, indicating that the user is actively viewing the selected channel.

In an embodiment the receiving station comprises a timer, arranged to be reset in response to any user interaction with the receiving station, and the enabling event comprises the timer reaching a predetermined timeout value.

In a further embodiment the receiving station comprises an on-screen display unit, and the enabling event comprises the on-screen display unit erasing an on-screen display element from a display system.

Figure 2:
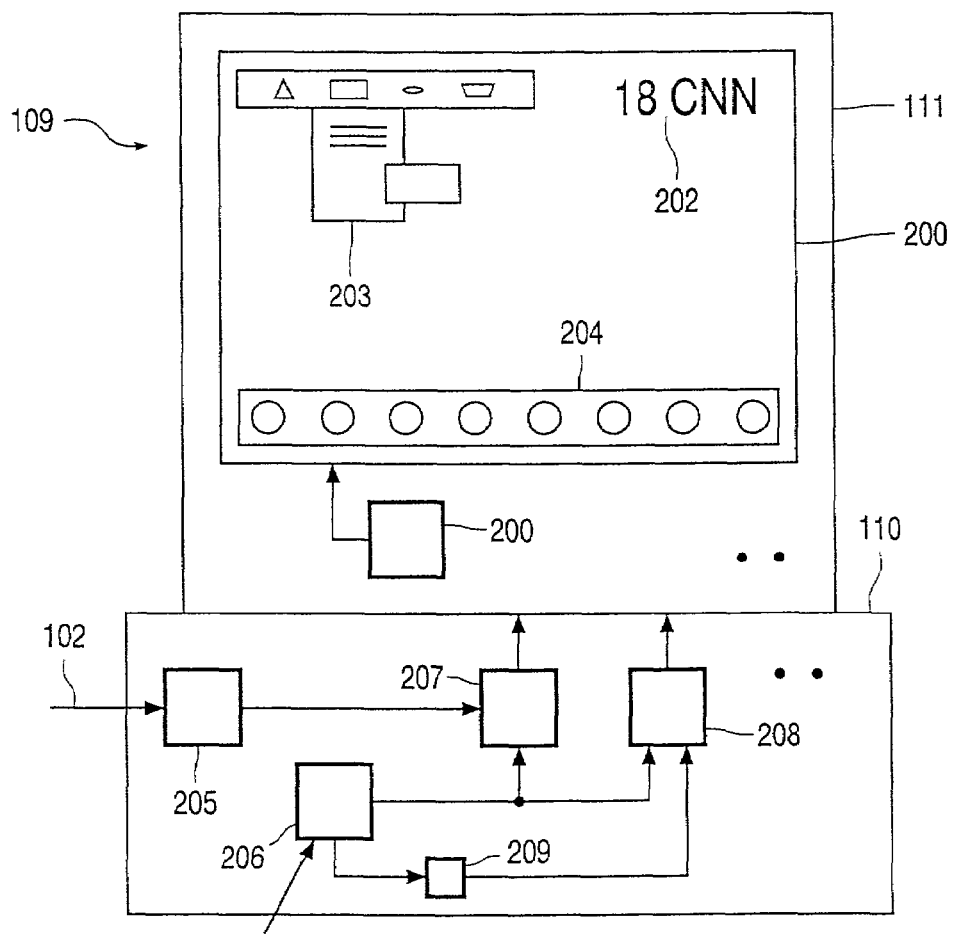

These and other aspects of the invention will be apparent from and elucidated with reference to the embodiments shown in the drawing, in which:

FIG. 1 shows a block diagram of an example broadcast chain comprising a receiving station according to the invention; and FIG. 2 shows a block diagram of a receiving station according to the invention.

Throughout the figures, same reference numerals indicate similar or corresponding features. Some of the features indicated in the drawings are typically implemented in software, and as such represent software entities, such as software modules or objects.

FIG. 1 shows a block diagram of an example broadcast chain comprising a receiving station according to the invention. There is a central server 100, which has several program sources 101. These sources 101 may include remote broadcast network feeds, videotape recorders, computers, data storage devices and the likes. These sources 101 also provide interactive applications, control information or audio or video information which is to be included in the signal to be transmitted. The information provided by the sources 101 is typically compressed using algorithms such as MPEG. The content from the sources usually comprises television programs, movies, live broadcast feeds, accompanying audio tracks, subtitles or Teletext information. The audio tracks or subtitles could be in multiple languages, to allow viewers to choose the language in which they wish to view the television program. To enhance the user experience, one or more applications can be provided. These can be used to add interactivity to the content, for example by providing a shopping mechanism to order the products advertised in the content, or by providing a Karaoke-like subtitling mechanism.

The information obtained from the sources is converted and processed to obtain a plurality of streams, each stream comprising a content portion 103, 104, 105 and zero or more application portions 106, 107, 108.

It is not necessary that all streams are digitally encoded. If no interactivity is provided, or if a normal television program from an external source is passed on, then the stream for that program can be provided in the ordinary fashion, for instance as an analog TV signal. This allows existing television sets to view at least the content portion of those streams. Streams which have digital content will typically result in only noise being displayed on such sets.

The server 100 multiplexes the plurality of streams into a signal 102. Said signal 102 comprises the content portions 103, 104, 105 and the application portions 106, 107, 108, possibly adding a number of ordinary television programs. The signal 102 is then transmitted to a receiving station 109, for example using a cable network, a satellite connection or any other transmission means.

The receiving station 109 comprises a set-top box 110 and a television system 111. Such a set-top box 110 can be any processing unit for receiving and processing a transmitted signal and conveying the processed signal to the television system 111, which could also be a computer monitor or any other output device. The set-top box may be in a housing which physically sits on top of a television, it may be in some other location external to the television (e.g., on the side or back of the television or remotely located from the television), or it may be incorporated into the television itself.

The received signal 102 comprises a plurality of streams. Each stream is associated with a channel on the television system 111, so that the user can access a stream by simply selecting a channel. The signal 102 will typically be transmitted to the receiving station 109 at a constant rate. A user can access a stream from the signal 102 by selecting a channel. In response to selecting a channel, the set-top box decodes the content portion 103 of the stream associated with the selected channel to produce audio and video output. If automatic execution of applications is enabled, the set-top box 110 further executes the application present in the application portion 106 of said stream. This application may also produce audio and video output. The set-top box 110 then generates a television program signal comprising the audio and video output of the decoded content portion 103 and optionally the output of the application. This television program signal is then transmitted to the television system 111, where it can be presented to the user.

It is possible that the application portions 106, 107, 108 present in the signal 102 are only downloaded on request. In that case, it is often preferable to In some systems, downloading an application causes the receiving station 109 to automatically execute it. To disable automatic execution, it is then necessary to disable the downloading of applications. The discussion below assumes that the actions of downloading and of executing an application can be performed separated. If they cannot, then disabling the execution of applications should be done in conjunction with, or should be replaced by, disabling the downloading of applications.

The receiving station 109 may have access to a return path 112, which an application can use to transmit data to the server 100 or to some other server, for example an automatic order intake system for ordering goods, or an information server for providing additional information on the content portion 103. This return path 112 is typically provided for by a modem within the set-top box 110, connected to a telephone line, which dials to the server. An internet connection or other transmission system can also be used.

It is not always necessary for the application portion 106, 107, 108 to be transmitted as a whole in the signal 102 at all times. Applications can consist of modules, and the receiving station 109 may employ a local caching mechanism for modules. Cached modules then do not need to be transmitted. In that case, applications are only transmitted if the receiving station 109 asks for them. Also, a part of an application could be transmitted, which itself can download other parts of the application if necessary. It may be advantageous to prevent such downloading if the execution of applications is disabled. This will save unnecessary transmissions and thereby save bandwidth.

FIG. 2 shows the television system 111, having a display system 200. The display system 200 can show the television program signal as generated by the set-top box 110. To facilitate the display of additional information and to provide interactivity, the display system 200 contains an On-Screen Display unit 201, which can draw textual and graphical elements on the television screen. These elements include such features as an identifier 202 for the channel which is currently selected, or a menu bar 203 with a plurality of submenus, or other features such as a plurality of icons 204 which can be selected by the user.

The television system 111 further comprises a receiving unit 205, a selection unit 206, a display control unit 207 and an execution unit 208, which are shown as part of the set-top box 110. It is possible for one or more of these units to be implemented as part of the display system 200, or to be implemented in software, which is executed on the set-top box 110, the television system 111 or another device that controls the television system 111.

When the user selects a channel for viewing, the selection unit 206 receives the selection. The selection is then transmitted to the display control unit 207, which displays the content portion 103, 104, 105 of the stream associated with the selected channel. Displaying a content portion 103, 104, 105 involves such actions as demodulating a portion of the signal 102, decrypting some or all of the content portion 103, 104, 105, decoding the information therein if they are encoded using systems such as MPEG, generating a television signal and transmitting the signal to the display system 200 so that this system 200 can show the content to a user.

The set-top box 110 can automatically execute any applications found in the stream associated with the selected channel. The set-top box 110 according to the invention will only do this when execution of applications is enabled. Thus, if execution of applications is disabled when a channel is viewed, any applications found in the stream associated with said channel will not be executed. If execution is subsequently enabled, for example by the user choosing the appropriate option in a menu, then the application is executed.

To this end, an execution unit 208 is provided, which can determine if execution of applications is enabled. If this turns out to be the case, the execution unit 208 executes an application present in the application portion 106, 107, 108 of the stream associated with the selected channel. Of course, if no application is present in the application portion 106, 107, 108, or if the stream associated with the selected channel has no application portion, then no application is executed. As explained with reference to FIG. 1, the application may produce audio and video output. The execution unit 208, together with the display control unit 207, generates a television program signal comprising the audio and video output of the decoded content portion 103, 104, 105 and optionally the output of the application. This television program signal is then transmitted to the television system 111, where it can be presented to the user.

If the execution unit 208 is capable of executing more than one application at the same time, it can be desirable to continue the execution of an already-running application when the user switches to another channel. Such an application should then not be affected by the disabling of execution of applications. For instance, if an application provides an enhanced user interface, or a game which is independent of the channel being viewed, it would be unwise to stop this application because the user selects a channel. Similarly, if the already-running application and the downloaded application both need the same resource, such as the display screen, then the execution unit 208 may decide to not execute the downloaded application.

In the set-top box 110, the execution unit 208 disables the execution of applications when the user selects a channel. If the user is viewing a channel, and then switches to another channel, for instance by pressing a "channel up/down" button on his remote control, execution of applications is disabled and any application found in the stream associated with the other channel will not be executed.

However, when the execution unit 208 determines that the user is actively viewing the channel, it enables the execution of applications, and an application present in an application portion 106, 107, 108 is then executed. This determination can be made in a variety of ways, depending on several types of enabling events that may occur. Actively viewing means that the user is interested in viewing the current channel. He then may wish to use the application, if any, that is provided with the content. However, if the user selects a channel and then walks away from the receiving station 109, he is not, strictly speaking, viewing the current channel, but there is no reason why execution of applications should not be enabled in that case. The user might have walked away to do something else while the application is being downloaded and executed, which may take a while. Thus, it still can be said he is actively viewing the current channel.

A first type of enabling event is a timeout occurring in a timer. The set-top box 110 can be provided with a timer 209, which is reset in response to any user interaction with the receiving station 109. The selection unit 206 is connected to the timer 209, and any selection that the selection unit 206 receives causes it to reset the timer 209. Other arrangements are also possible. For instance, the timer 209 could be provided in the television system 111 where it can also respond to user interactions using buttons on the front of the television system 111. Thus, whenever the user presses a button on his remote control, or whenever he selects an icon from the plurality 204 or an option in the menu 203, he interacts with the receiving station 109, and then the timer 209 is reset. The timer 209 is increased or decreased at regular intervals, for instance every second. When the timer 209 reaches a predetermined value, it can be assumed that the user is actively viewing the selected channel. In response to this enabling event, automatic execution is enabled and any application found in the stream associated with the other channel will then after all be executed. If the user is away from the receiving station 109 for a sufficiently long period of time after selecting a channel, the timeout will occur and execution of applications will be enabled. Once he returns, the application will have started and he can start using it.

The predetermined value can be a number of seconds, which must be chosen sufficiently high to avoid accidentally determining that the user is actively viewing the selected channel. When the user is "zapping" from channel to channel, he may want to view every channel for a few seconds, so the predetermined value must be higher than that. When, for example, the user is viewing a channel for more than thirty seconds, it can safely be assumed that he is actively viewing the channel instead of taking a quick peek before zapping to another channel.

The predetermined value can also be chosen to correspond to a banner duration time. A banner is a small graphics window that is displayed on the display screen to supply information to the user. In most set-top boxes and analogue TV sets, a banner is displayed for a brief time interval, e.g. one second, for each time that the user presses a channel navigation button such as channel up/down on his remote control. Such a banner displays information about the channel the user has selected, such as the name of the channel or the channel number. The channel identifier 202 is an example of such a banner. It is often possible for the user to suppress the display of such banners. By choosing the predetermined value equal to a banner duration time, the execution of any application will coincide with the removal of the banner. This gives the user the time to "zap" to another channel before this happens.

It is also possible to determine that the user is actively viewing the selected channel by observing the behavior of the On-Screen Display unit 201. Similar to banners, elements of the on-screen display will be removed after a certain period of inactivity. The plurality of icons 204 may, for instance, be displayed when the user presses a button on the remote control, but if the user makes no selection from the icons 204 within a certain period of time, the plurality is removed from the screen. The same behavior is typically used for the menu bar 203. The menu bar 203 and the plurality of icons 204 may also show when a new channel is shown. The removal of the menu bar 203 or the plurality of icons 204 therefore serve as an indicator that the user is not interested in interacting with the system, but instead wishes to view the selected channel. Thus, erasing an on-screen display element from the display system can be used as an enabling event.

In particular, when more than one on-screen display element is shown, then enabling event can be assumed to have occurred when the last of these elements has been erased from the screen. However, the user may be interested in using the menu bar 203, but not the plurality of icons 204, and in that case, assuming the enabling event occurs when the plurality of icons 204 is removed would be incorrect.

On-screen display elements are not always removed after a certain period of time. In that case, only those elements that are automatically removed after a certain period should be taken into consideration for the generation of the enabling event.

The identifier 202 for the current channel can also be used as the on-screen display element whose erasure is detected and which then causes the enabling event to be generated.

The invention claimed is:

1. A method of automatic execution of an application on a receiving station, said method comprising the steps of:
   receiving a signal comprising a plurality of streams, each stream being associated with a channel on the receiving station and comprising a content portion and zero or more application portions;
   receiving a channel selection from a user;
   displaying the content portion of the stream associated with the selected channel; and
   when execution of applications is enabled, executing an application present in the application portion, if any, of the stream associated with the selected channel, characterized in that the method further comprises the steps of:
   disabling execution of the application of the stream associated with the channel in response to the user selecting the channel; and
   enabling execution of the application of the stream associated with the channel in response to the occurrence of an enabling event indicating that the user is actively viewing the selected channel.

2. The method as claimed in claim 1, characterized in that a timer is reset in response to any user interaction with the receiving station, and the enabling event comprises the timer reaching a predetermined timeout value.

3. The method as claimed in claim 1, characterized in that the enabling event comprises the erasing of an on-screen display element from a display system.

4. The method as claimed in claim 3, characterized in that the on-screen display element is an identifier for the current channel.

5. The method as claimed in claim 3, characterized in that the on-screen display element is the last of a plurality of on-screen display elements being displayed.

6. The method as claimed in claim 1, wherein execution of all applications is disabled in response to the user selecting the channel.

7. A receiving station comprising:
   a receiving unit for receiving a signal comprising a plurality of streams, each stream being associated with a channel on the receiving station and comprising a content portion and zero or more application portions;
   a selection unit for receiving a channel selection from a user;
   a display control unit for displaying the content portion of the stream associated with the selected channel; and
   an execution unit for determining if execution of applications is enabled, and if so, executing an application present in the application portion, if any, of the stream associated with the selected channel,
   characterized in that
   the execution unit disables execution of the application of the stream associated with the channel in response to the user selecting the channel, and
   the execution unit enables execution of the application of the stream associated with the channel in response to the occurrence of an enabling event indicating that the user is actively viewing the selected channel.

8. The receiving station as claimed in claim 7, characterized in that the receiving station further comprises a timer arranged to be reset in response to any user interaction with the receiving station, and the enabling event comprises the timer reaching a predetermined timeout value.

9. The receiving station as claimed in claim 7, characterized in that the receiving station further comprises an on-screen display unit, and the enabling event comprises the on-screen display unit erasing an on-screen display element from a display system.

10. The receiving station as claimed in claim 9, characterized in that the on-screen display element is an identifier for the current channel.

11. The receiving station as claimed in claim 9, characterized in that the on-screen display element is the last of a plurality of on-screen display elements being displayed by the on-screen display unit.

12. The receiving station as claimed in claim 7, wherein the execution unit disables execution of all applications in response to the user selecting the channel.

* * * * *